April 25, 1967
J. PERDUE
3,315,919
RETRACTABLE UNDERCARRIAGES
Filed Nov. 17, 1964
5 Sheets-Sheet 5
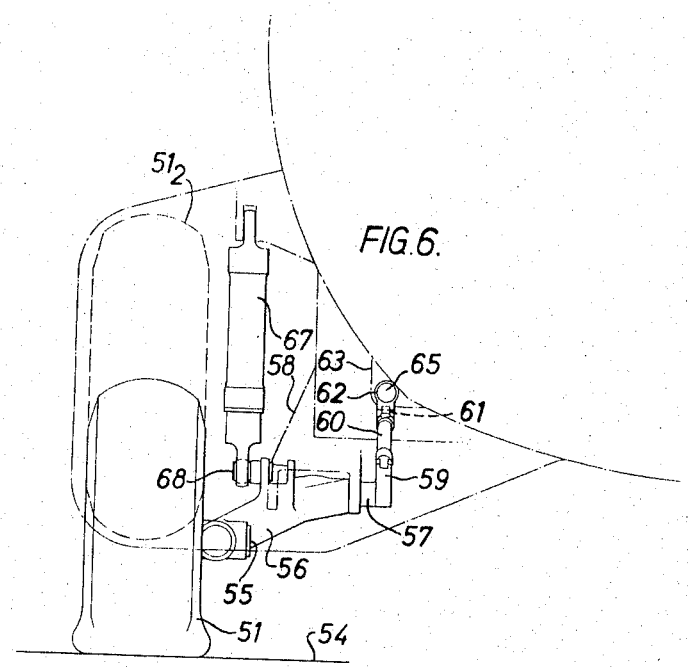
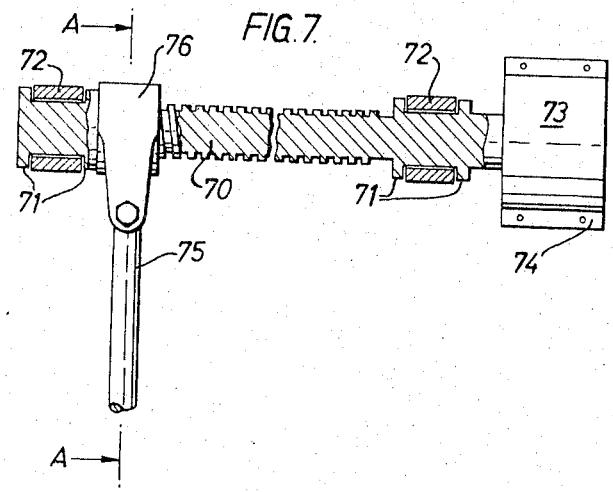
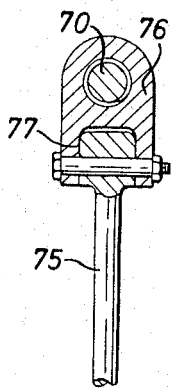

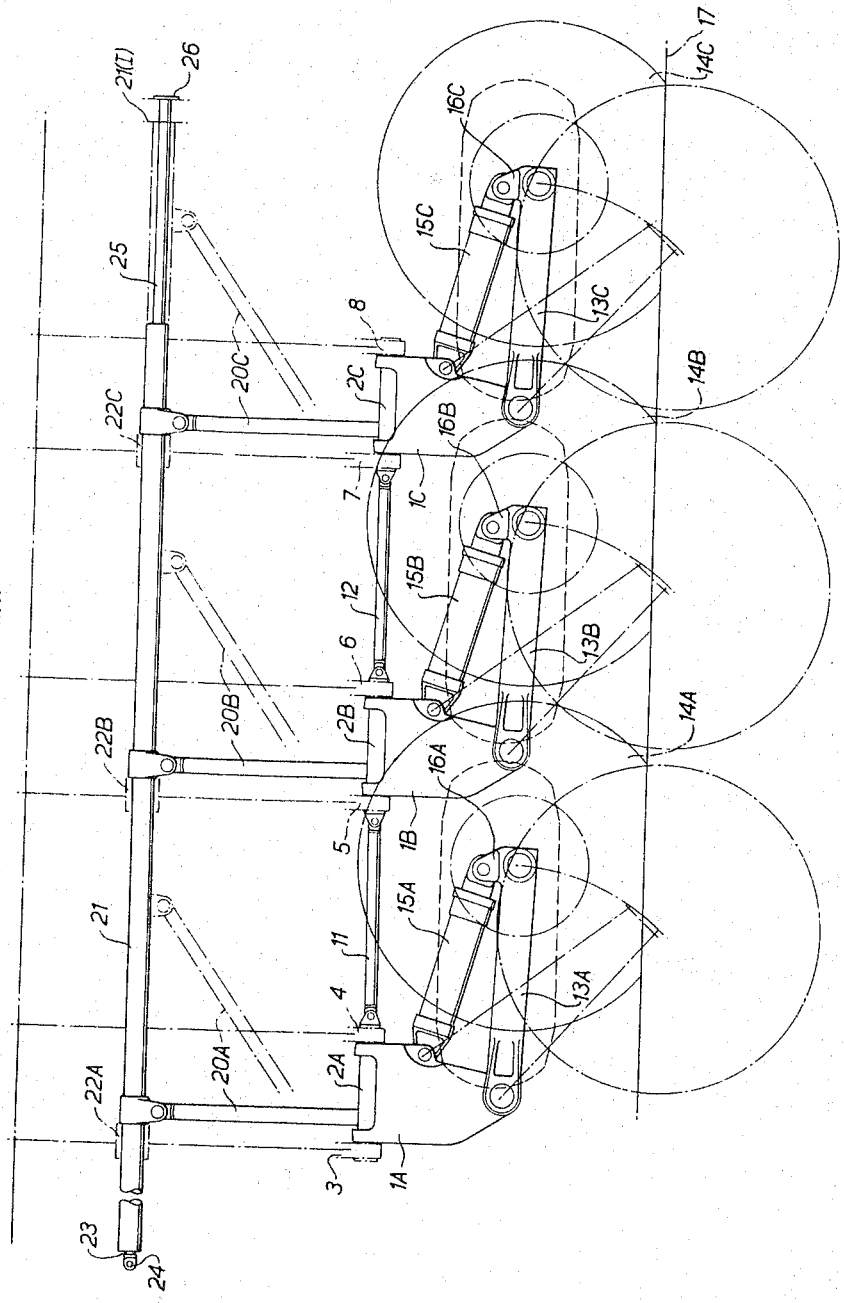

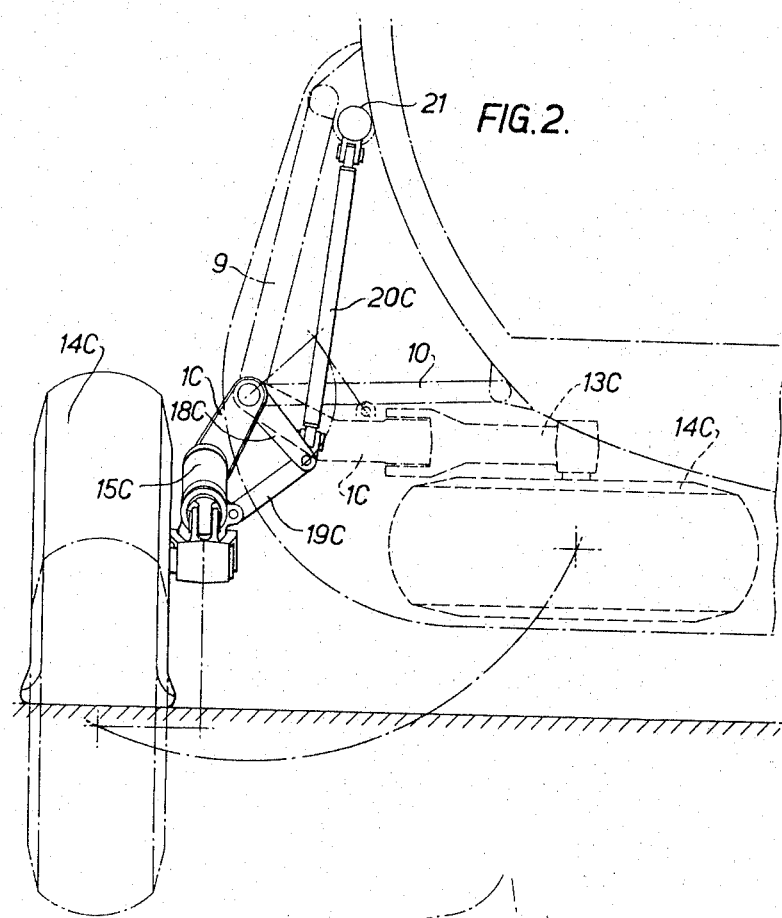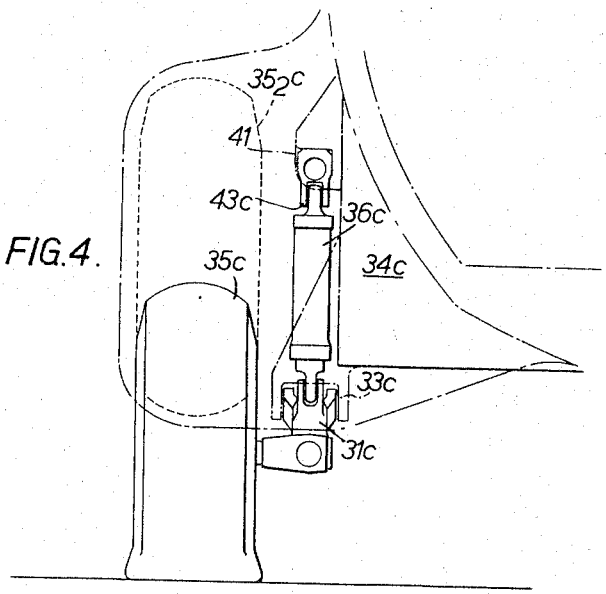

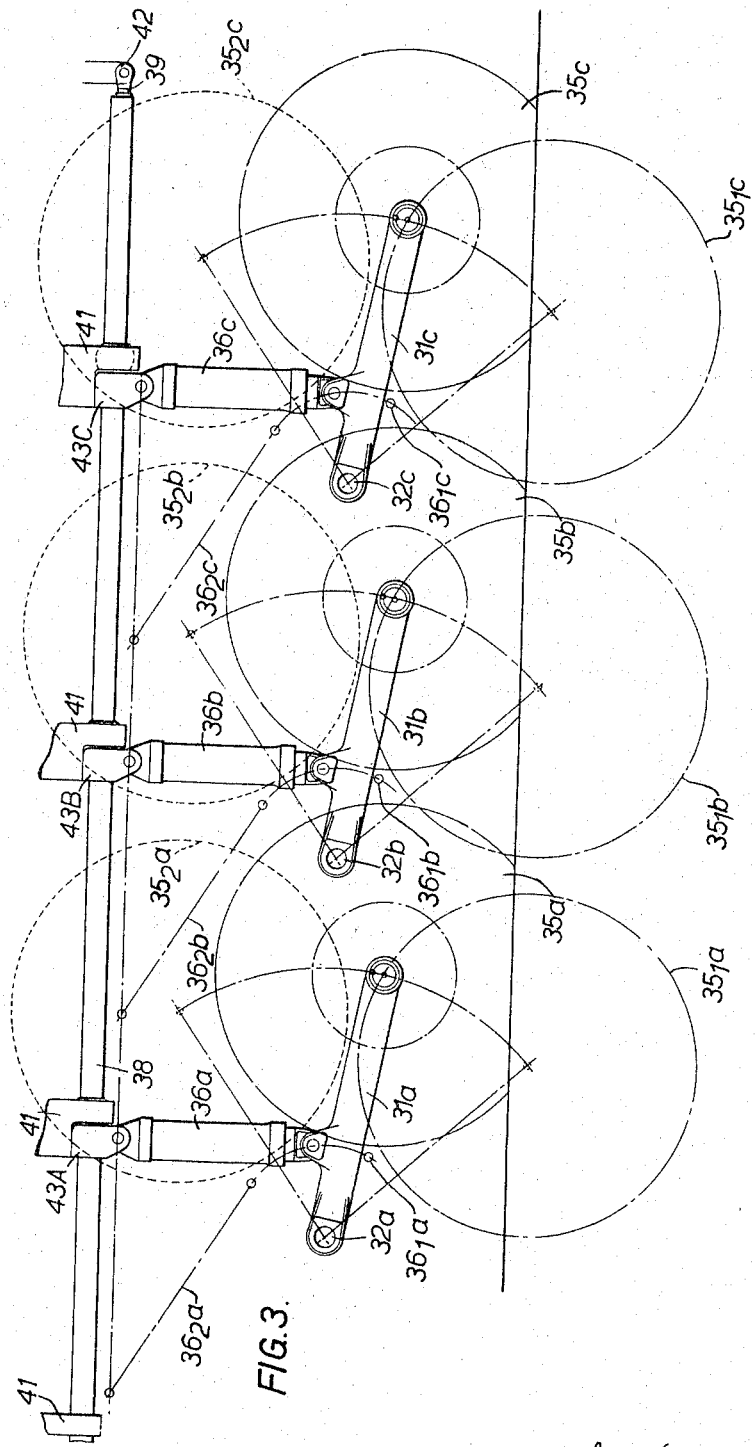

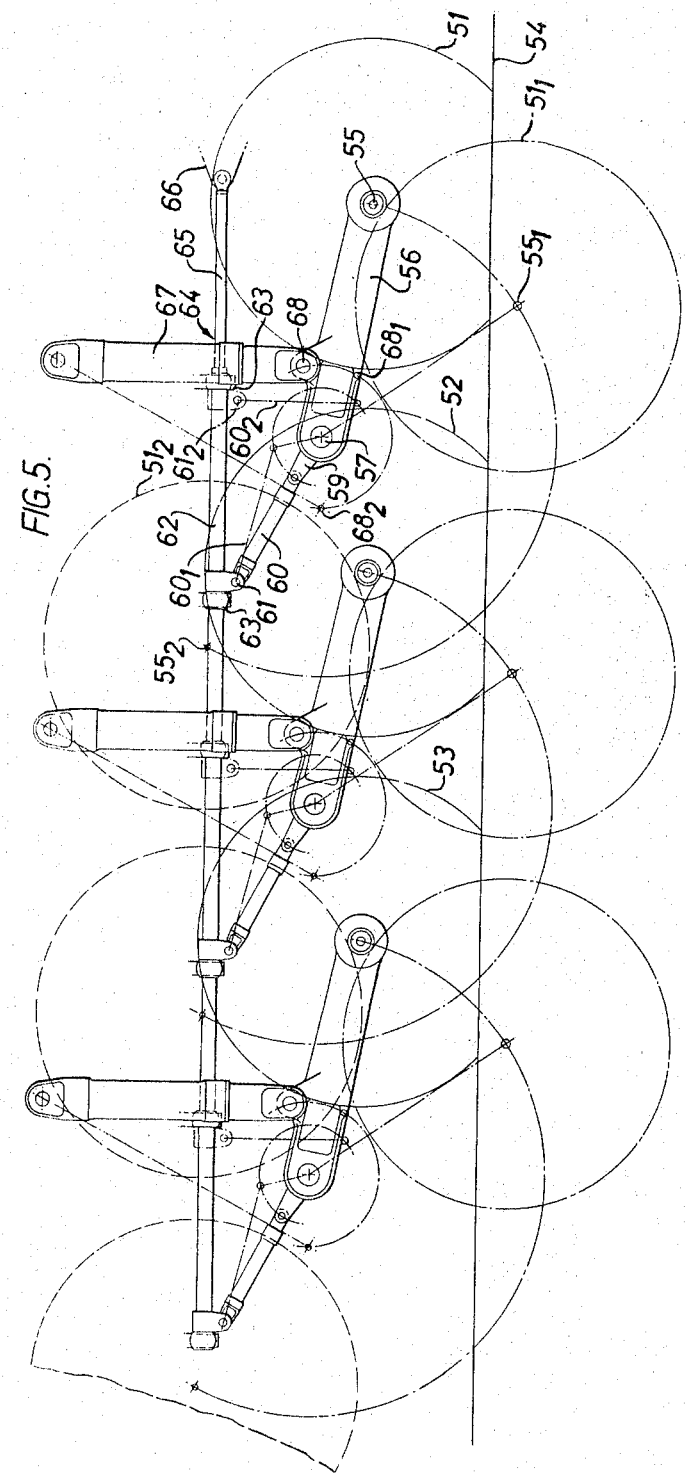

United States Patent Office 3,315,919
Patented Apr. 25, 1967

3,315,919
RETRACTABLE UNDERCARRIAGES
Jack Perdue, Great Sankey, Warrington, England, assignor to Electro-Hydraulics Limited, Warrington, England, a corporation of England
Filed Nov. 17, 1964, Ser. No. 411,747
Claims priority, application Great Britain, Nov. 18, 1963, 45,483/63; Dec. 30, 1963, 51,158/63; Mar. 5, 1964, 9,363/64
13 Claims. (Cl. 244—102)

This invention relates to retractable undercarriages for aircraft.

According to the present invention, an aircraft retractable undercarriage with at least one wheel assembly comprises a member having pivotal connection to the aircraft and with which a wheel assembly is connected, a retracting rod acting between said member and an actuating shaft, and power operated means for effecting movement of the shaft relative the pivotal connection whereby the member is caused to pivot about its pivotal connection to the aircraft thereby raising and lowering the wheel assembly.

The aircraft retractable undercarriage preferably comprises a plurality of wheel assemblies in line astern, each assembly being raised and lowered by a common actuating shaft.

According to one embodiment of the invention, actuation of said actuating shaft causes the wheels to swing in a plane substantially transverse to the longitudinal axis of the aircraft. In this embodiment, a shock absorber is pivotally mounted between each said member and a trailing link mounted thereon, to which link said wheels are rotatably secured.

According to a second embodiment of the invention, actuation of the said actuating shaft causes the wheels to swing upwards in their own plane and vice versa.

In the second embodiment, a shock absorber acts as the said retracting rod.

In a third embodiment of the invention, the wheels retract by swinging from a position spaced to one side of their pivotal connection to the aircraft to a position spaced to the other side of said pivotal connection. In this embodiment, a shock absorber acts between the aircraft and the said member, and said retracting rod is telescopic.

The invention will now be described with reference to the accompanying drawings, in which:

FIGURE 1 is a side elevation of a multiple wheeled aircraft retractable undercarriage according to one embodiment and FIGURE 2 is an end elevation of one wheel assembly and the accompanying retracting gear, of that embodiment;

FIGURE 3 is a side elevation of a multiple wheeled aircraft retractable undercarriage according to an alternative embodiment and FIGURE 4 is an end elevation of one wheel assembly and the accompanying retracting gear of the embodiment of FIGURE 3;

FIGURE 5 is a side elevation of a multiple wheeled aircraft retractable undercarriage according to a further alternative embodiment and FIGURE 6 is an end elevation of one wheel assembly and the accompanying retracting gear, of the embodiment of FIGURE 5;

FIGURE 7 shows a part sectional side elevation of an alternative type of retracting mechanism to those shown in FIGURES 1–6, for one of the wheel assemblies and FIGURE 8 is a section on the line A—A of FIGURE 7;

In FIGURES 1 to 6, the undercarriage is shown in the lowered position, with the aircraft on the ground; in FIGURES 1, 3 and 5 the position of the wheels when the aircraft is airborne with the undercarriage lowered, is shown by the chain lines and with the undercarriage retracted, by the dotted lines in the FIGURES 1 to 6.

Referring to the embodiment of FIGURES 1 and 2, in which embodiment the wheels retract by swinging sideways about an axis parallel to the longitudinal axis of the aircraft frame and in a plane substantially transverse to the axis of the aircraft, the retractable undercarriage comprises members 1A, 1B, 1C carried by pins 2A, 2B, 2C in bearings 3, 4, 5, 6 and 7, 8. Each bearing 3 through 8 is rigidly secured to the aircraft frame structure by pairs of members, one pair 9, 10 which secures the bearing 7, being shown in FIGURE 2 (bearing 8 being omitted from FIGURE 2 for the sake of clarity). The pins 2A, 2B, 2C are connected by universally jointed links 11, 12 so that any drag loads are transmitted to the pin 2C for reaction by a member (not shown) connecting the pin 2C to the aircraft structure. To trailing links or wheel journalling members 13A, 13B, 13C are secured axles for wheels 14A, 14B, 14C, rotatably mounted thereon. The wheels are shown in outline only in FIGURE 1. The trailing links, together with shock absorbers 15A, 15B, 15C pivoted to lugs 16A, 16B, 16C on the respective trailing links 13A, 13B, 13C, mainly comprise three suspension systems which are pivotally connected to the aircraft frame via the respective members 1A, 1B, 1C.

The undercarriage is shown in the lowered position with the aircraft on the ground, the ground line being shown at 17. Two pivotally interconnected links 18A, 19A; 18B, 19B; 18C, 19C; are pivotally connected to the respective members 1A, 1B, 1C. Retracting rods 20A, 20B, 20C each have one end pivotally connected to an actuating shaft 21, with the other end universally connected to the pivotal interconnection of the respective links 18, 19. The shaft 21 is slidable in the fore and aft direction in bearings 22A, 22B, 22C fixed in the aircraft. A retraction jack 23 is housed substantially within the shaft 21, its cylinder being connected to the shaft 21 and its piston rod being pivotally connected to a fixed point on the aircraft at 24. A guide 25 has one end secured to a fixed point in the aircraft at 26, whilst its other end slidably supports the end of the shaft 21 remote from the retraction jack 23.

The undercarriage is raised by extending the retraction jack 23. Extension of the jack 23 causes the actuating shaft 21 to move to the right (as shown on FIGURE 1) to the position 21(1) shown in chain lines. Since the retraction rods 20A, 20B, 20C have their upper ends pivotally secured to shaft 21, their upper ends will move to the right with the shaft 21. Consequently, since the lower ends of the said rods are universally jointed to the pivotal interconnection of links 18, 19, when the upper ends of the retracting rods 20 move to the right, their lower ends must lift, rotating the members 1A, 1B, 1C, and hence, the complete wheel assemblies, on their pins 2, to the retracted position of the undercarriage as indicated in dotted lines in FIGURE 2. Suitable known means are provided for locking of the undercarriage in the lowered and the retracted positions. The locking means for the lowered and/or retracted positions may conveniently comprise a mechanism lock or locks incorporated in the retraction jack.

Another embodiment is shown in FIGURES 3 and 4. In this embodiment the wheels retract by swinging upwards in their own plane about an axis normal to the longitudinal axis of the aircraft frame.

Referring to FIGURES 3 and 4, a retractable undercarriage comprises trailing links 31a, 31b, 31c, pivotally connected to the aircraft structure via pins 32a, 32b, 32c and brackets 33a, 33b, 33c, which latter are secured to the aircraft frame structure by members 34a, 34b, 34c.

Wheels 35a, 35b, 35c are shown in the position assumed when the undercarriage is lowered and the aircraft is on the ground. The wheels are shown in outline only in FIGURE 3. $35_1a$, $35_1b$, $35_1c$, represent the position of the wheels when the aircraft is in flight with the undercarriage lowered. The positions of the pivotal connection between shock absorbers 36a, 36b, 36c and their respective trailing links 31a, 31b, 31c when the aircraft is in flight with the undercarriage lowered are shown at $36_1a$, $36_1b$, $36_1c$.

Retracting rods, constituted in this instance by the shock absorbers 36a, 36b, 36c, are pivotally connected to the trailing links 31a, 31b, 31c and to a common actuating shaft 38 via brackets 43A, 43B, 43C. The actuating shaft 38 is mounted in bearings 41 secured to the aircraft structure. An hydraulic jack 39, housed substantially within the actuating shaft 38, is connected between the said shaft 38 and the aircraft structure at 42. As shown, the jack 39 is in the closed position and, on extension, the shaft 38 is moved to the left, taking with it the upper ends of the shock absorbers 36a, 36b, 36c, thus causing the links 31a, 31b, 31c to rotate in an anticlockwise direction, as shown, so that the wheels 35a, 35b, 35c are moved into the retracted positions as shown at $35_2a$, $35_2b$, $35_2c$. The chain lines $36_2a$, $36_2b$, $36_2c$ represent the position of the centre lines of the shock absorbers when the undercarriage has been retracted. The undercarriage is locked in the retracted and the lowered positions by known means (not shown) which may conveniently comprise mechanical locks incorporated in the hydraulic jack 39. It will be seen that substantially all the vertical loads are transferred to the aircraft structure via the shock absorbers 36a, 36b, 36c, the brackets 43A, 43B, 43C, and the bearings 41.

Although the actuation of the shaft 38 has been described as being motivated by a jack, the jack can be replaced by other means for producing linear motion of the actuating shaft, for example a rack and pinion device operated through any convenient motor.

In certain installations, for structural reasons it may not be convenient to provide the bearings 41 located as described. In such cases the mechanism can be modified by the provision of the track or sections of track, for example of inverted U or of I shape, and the brackets 43A, 43B, 43C are arranged to be retained by and to slide within the track. The actuating shaft 38 then comprises a number of links which connect together the brackets 43A, 43B, 43C for lengthwise movement in the track by the power operated means. The track can readily be secured to the aircraft structure without the necessity for substantial local strengthening such as may be necessary in the case of the bearings 41. Substantially all the vertical loads are transmitted to the aircraft structure via the shock absorbers, the brackets and the track. The track, or sections thereof, and the actuating shaft may include means for exclusion of foreign matter from the track, for example sealing means.

Another embodiment of the invention is shown in FIGURES 5, 6. In this embodiment the wheels retract by swinging about an axis normal to the longitudinal axis of the frame and in their own plane from a position spaced from one side of their pivotal connection to a position spaced to the other side of their pivotal connection.

Referring to FIGURES 5 and 6, a retractable undercarriage is shown in the lowered position with the aircraft on the ground and has three wheels 51, 52, 53—shown in outline only in FIGURE 1—and the ground line is indicated at 54.

The wheel 51 is rotatably mounted on an axle 55 on a member 56 which is itself pivotally connected at 57 to a bracket 58 secured to the aircraft structure. The member 56 includes an arm 59 which is pivotally connected to an end of a telescopic retracting rod 60 whose other end is pivotally connected at 61 to an actuating shaft 62. The actuating shaft 62 is mounted in bearings 63 on the aircraft for longitudinal movement. The cylinder of an hydraulic jack 64 is located inside the actuating shaft 62 and a piston rod 65 is connected to a bracket 66 on the aircraft. A shock absorber 67 is pivotally connected at its lower end 68 to the member 56, and at its other end to the aircraft. The wheels 52 and 53 are similarly mounted on members pivoted to the aircraft and have retracting rods as 60 connected to the actuating shaft 62 and shock absorbers as 67 connected between the members and the aircraft.

When the aircraft takes off, the shock absorber 67 extends until the pivot point 68 reaches the point $68_1$, thereby urging the wheel 51 downwardly, and causing the retracting rod 60 to extend freely until it reaches the position $60_1$ when it is fully extended against internal stops. The shock absorbers and retracting rods for the wheels 52, 53 extend in like manner. Operation of the hydraulic jack 64 to close the cylinder over the piston rod 65 causes the actuating shaft 62 to move to the right (as shown). The end of the retracting rod 60 connected to the actuating shaft 62 moves to the right (as shown) permitting further extension of the shock absorber 67. When the latter is fully extended, continued movement of the shaft 62 to the right causes closure of the retracting rod 60 and then clockwise (as shown) rotation of the member 56 about the pivot 57 and partial closure of the shock absorber 67 until the wheel 51 reaches the fully retracted position as shown at $51_2$. The pivotal connection 61 is now at position $61_2$ and the rod 60 at the position $60_2$. When the undercarriage is retracted, the pivot point 68 will be in the position $68_2$. The wheels 52 and 53 are simultaneously moved in a similar manner into the retracted position. The undercarriage may be locked in the up position by a mechanical lock of known type incorporated in the hydraulic jack 64.

The undercarriage is lowered by release of the up lock and extension of the hydraulic jack 64. The actuating shaft 62 moves to the left, the member 56 rotates anticlockwise and the shock absorber 67 extends. When the latter has fully extended, the rod 60 extends and then causes further rotation of the member 56 and partial closure of the shock absorber 67 until the wheel 51 reaches the lowered free in air position $51_1$ on-full extension of the hydraulic jack 64. The axle 55 will then take up the position $55_1$. The undercarriage may be locked in the lowered position by known means, for example a mechanical lock in the hydraulic jack 64. The wheels 52, 53 are simultaneously lowered in like manner.

It will be appreciated that instead of using an hydraulic jack for actuating the shaft 62, a rack and pinion device or other means for producing linear motion of the shaft may be provided.

In the three embodiments so far described, lengthwise movement of the actuating shaft has been used for retracting the undercarriages. However, an alternative arrangement may be used in which the shaft is rotated about its own axis. Such an arrangement, for one of the wheel assemblies, is shown in FIGURES 7 and 8. It will be appreciated that it can equally well be used for multiple wheeled undercarriages.

Referring to FIGURES 7 and 8, an externally screw threaded actuating shaft 70 has collars 71 for location in bearings 72 which are secured to the aircraft. A rotary motor 73, e.g. fluid pressure or electrically operated, is drivingly connected to the shaft 70 and is secured to the aircraft structure, for instance, by a bolted flange 74. A retracting rod 75 is pivotally connected to an internally threaded member 76 on the shaft 70. It will be appreciated that the parts 75 and 76 are duplicated for multiple wheeled undercarriages. On rotation of the shaft 70 by the motor 73, each member 76 moves to the right, taking with it the upper end of each retracting rod 75, and so causing retraction of the undercarriages shown in any of FIGURES 1–6.

It will be appreciated that the members 76 must not be permitted to rotate relative to the aircraft structure, e.g. due to frictional drag between the shaft 70 and the members 76. Prevention of such rotation can be arranged in a variety of ways. As shown in FIGURE 8, the rod 75 fits closely within the member 76, and an adequate bearing portion is provided at 77, the rod 75 being sufficiently rigid to resist bending. Alternatively, torque links can be provided to connect between the member 76 and the aircraft structure.

It will be appreciated that with this above construction of screw threaded actuating shaft, the members 21–26 of FIGURES 1 and 2; 39, 41, 42 and 43 of FIGURES 3 and 4 and the members 61–66 of FIGURES 5 and 6 will be replaced by the members 70–74 and 76 of FIGURES 7 and 8.

This invention has been described with reference to embodiments incorporating trailing link type undercarriages, but it will be appreciated that the invention is equally applicable to undercarriages of the so-called leading link type.

What is claimed is:

1. An aircraft retractable undercarriage comprising a plurality of wheel assemblies mounted in line astern for sideways pivotal movement, a member pivotally connected to the aircraft and to each wheel assembly, an actuating shaft mounted on the aircraft for movement longitudinally thereof, a retracting rod for each member pivotally sideways connected to said actuating shaft and a part of said member, and power operated means operative to move said shaft, said movement causing said members to pivot about their said connections to the aircraft, thereby, through said retracting rods, raising and lowering said undercarriage.

2. An aircraft retractable undercarriage as claimed in claim 1, wherein said pivotal connection of each said member to the aircraft comprises a pin secured to the aircraft with its axis parallel to the longitudinal axis of the aircraft, each of said pins being interconnected by pivotal connecting rods.

3. An aircraft retractable undercarriage as claimed in claim 2, in which universal coupling means connect said retracting rod to the associated member at points transversely spaced inwardly of the pivotal connection of each of said members to the aircraft.

4. An aircraft retractable undercarriage as claimed in claim 3, wherein said actuating shaft is mounted in parallel spaced relation to each of said pins in bearings for lengthwise movement relative to said pins, and further comprising a hydraulic jack operative to cause said lengthwise movement.

5. An aircraft retractable undercarriage as claimed in claim 4, further comprising a trailing link pivotally connected to each of said members and a shock absorber mounted between each of said trailing links and its respective member.

6. An aircraft retractable undercarriage comprising a plurality of wheel assemblies mounted in line astern, each on a member respectively pivotally connected to the aircraft about an axis transverse that of the aircraft, a plurality of axially aligned bearing means spaced longitudinally of and secured to said aircraft, an actuating shaft mounted in said bearing means, a plurality of shock absorbers respectively connecting each said member to said shaft, an hydraulic jack for causing lengthwise movement of said actuating shaft, said movement being effective to swing said wheel assemblies in the same plane as that of the wheels from an operative to an inoperative position and vice versa.

7. An aircraft retractable undercarriage comprising at least one wheel journaling member pivotally connected to the aircraft; a telescopic shock absorber pivotally connected between said member and a fixed point on the aircraft; an actuating shaft mounted for movement longitudinally of the aircraft; a telescopic retracting rod acting between said member and said actuating shaft; and power operated means for effecting longitudinal movement of the shaft to pivot said member about its pivotal connection to said aircraft and cause said member to swing from a lowered position on one side of its pivotal connection, in which position it is capable of limited pivotal movement relative to the aircraft under the control of said shock absorber, to a retracted position on the other side of its pivotal connection to said aircraft.

8. An aircraft retractable undercarriage as claimed in claim 7, wherein said retracting rod is pivotally connected to said actuating shaft for movement therewith, said power operated means comprising an hydraulic jack.

9. An aircraft retractable undercarriage as claimed in claim 7 comprising a plurality of similar wheel journaling members pivoted to the aircraft in tandem relation; a corresponding plurality of telescopic shock absorbers pivotally connected to said aircraft and to the respective members; and a corresponding plurality of telescopic retracting rods pivotally connected to said actuating shaft and to the respective members.

10. A retractable undercarriage for aircraft comprising aircraft frame means; at least one wheel journaling member pivotally mounted on said frame means for movements between extended and retracted positions; shock absorber means pivoted on and acting between said frame means and said member; an actuating shaft member mounted on said frame means for back-and-forth movements longitudinally of said frame means; retracting means acting on said members and operable in response to back-and-forth movements of said shaft member to move said journaling member from and to said positions; and operating means connected to said shaft member for moving the latter selectively back and forth.

11. The construction set forth in claim 10 wherein said journaling member is mounted on said frame means for pivotal movements about an axis parallel to said longitudinal axis of said frame means.

12. The construction set forth in claim 10 wherein said journaling member is mounted on said frame means for pivotal movements about an axis normal to said longitudinal axis of said frame means.

13. The construction set forth in claim 10 wherein said retracting means is constituted by said shock absorber means.

References Cited by the Examiner

UNITED STATES PATENTS

| 2,413,986 | 1/1947 | Martin | 244—102 |
| 3,041,020 | 6/1962 | Willitt | 244—102 |
| 3,111,292 | 11/1963 | Martin | 244—102 |
| 3,188,026 | 6/1965 | Perdue et al. | 244—102 |
| 3,198,461 | 8/1965 | Beach | 244—102 |

FOREIGN PATENTS 310,857   2/1919   Germany.

References Cited by the Applicant

FOREIGN PATENTS

| 45,483 | 11/1963 | Great Britain. |
| 51,158 | 12/1963 | Great Britain. |
| 9,363 | 3/1964 | Great Britain. |

MILTON BUCHLER, Primary Examiner.

L. C. HALL, P. E. SAUBERER, Assistant Examiners.